(12) United States Patent
Carruth et al.

(10) Patent No.: US 6,168,221 B1
(45) Date of Patent: Jan. 2, 2001

(54) MAGNETIC CARRIER

(75) Inventors: Cary Carruth, East China; Ronald P. Modrak, Clinton Township, both of MI (US)

(73) Assignee: DaimlerChrysler Corporation, Auburn Hills, MI (US)

( * ) Notice: Under 35 U.S.C. 154(b), the term of this patent shall be extended for 0 days.

(21) Appl. No.: 09/271,132

(22) Filed: Mar. 17, 1999

(51) Int. Cl.⁷ .............................. B25J 15/06; B66C 1/04
(52) U.S. Cl. ............................ 294/65.5; 294/88
(58) Field of Search .................... 294/65.5, 88, 115; 335/285, 287, 288, 291, 292, 294, 296, 298, 302, 306; 414/606, 737

(56) References Cited

U.S. PATENT DOCUMENTS

| | | |
|---|---|---|
| 1,685,707 | 9/1928 | Keedy . |
| 2,417,762 | 3/1947 | Koller . |
| 2,976,075 | 3/1961 | Budreck . |
| 3,009,727 * | 11/1961 | Jones et al. ............... 294/65.5 |
| 3,079,191 | 2/1963 | Engelsted et al. . |
| 3,198,566 * | 8/1965 | Floros et al. ............... 294/65.5 |
| 3,250,962 | 5/1966 | Palme . |
| 3,257,141 | 6/1966 | Buus et al. . |
| 3,320,686 | 5/1967 | Blackburn . |
| 3,487,964 * | 1/1970 | Riley ....................... 294/65.5 X |
| 4,620,739 | 11/1986 | Coralline . |
| 4,722,283 | 2/1988 | Holley . |
| 4,943,099 | 7/1990 | Gabriel . |
| 5,292,165 | 3/1994 | Wiklund . |
| 5,435,613 | 7/1995 | Jung . |
| 5,845,950 | 12/1998 | Stowe et al. . |

FOREIGN PATENT DOCUMENTS

| | | | |
|---|---|---|---|
| 2115847 * | 10/1972 | (DE) | ............... 294/65.5 |
| 2509003 * | 9/1976 | (DE) | ............... 294/65.5 |
| 2821817 * | 11 1979 | (DE) | ............... 294/65.5 |
| 1094296 | 9/1964 | (GB) . | |
| 2184603 * | 6/1987 | (GB) | ............... 294/65.5 |
| 1527123 * | 12 1989 | (SU) | ............... 294/65.5 |
| 1557053 * | 4/1990 | (SU) | ............... 294/65.5 |
| 1812103 | 4/1993 | (SU) . | |

* cited by examiner

Primary Examiner—Johnny D. Cherry
(74) Attorney, Agent, or Firm—Lawrence J. Shurupoff

(57) ABSTRACT

A magnetic carrier includes a housing having an interior ledge. First and second levers are pivotally mounted within the housing such that the ledge limits the angular position of the levers with respect to the housing. First and second permanent magnets are connected with the respective first and second levers for attracting a workpiece. A pneumatic piston actuator is provided on the housing for pivoting the levers with respect to the housing to selectively pivot the magnets into and out of magnetic engagement with the workpiece.

6 Claims, 2 Drawing Sheets

MAGNETIC CARRIER

FIELD OF THE INVENTION

This invention relates generally to a material holding device and more particularly to a magnetic carrier for holding parts.

BACKGROUND OF THE INVENTION

Parts, especially relatively small and narrow die-stamped parts, are typically extracted from press lines by venturi vacuum cups. Shop air is used for this purpose. However, in practice, the parts are frequently dropped by the vacuum cups. For small, narrow parts, there is usually not enough room to properly locate a small cup. Vacuum cups must be set exactly to the contour of the part in order to be effective.

SUMMARY OF THE INVENTION

The magnetic carrier of this invention is designed to replace vacuum venturi cups. The magnetic carrier of this invention is faster on set up, more forgiving than vacuum cups and very reliable. The magnetic carrier of this invention can be operated with only a minimum amount of air, thus saving plant air. The magnetic carrier of this invention is quiet in operation in contrast to the noise and whistling sounds typical of a venturi used to activate a vacuum cup. The magnetic carrier of this invention is formed of lightweight materials having a long life and preferably using a permanent magnet with maximum pick-up power.

The magnetic carrier of this invention can be built in different sizes. A preferred embodiment magnetic carrier of the present invention can be used in dirty environments, and can also be used in all directional orientations. In a preferred embodiment, the magnetic carrier of the present invention provides a housing with a closed top and a covered nonmagnetic bottom. The housing also has an interior ledge to react lifting loads applied to the magnets.

First and second levers are pivotally mounted within the housing. The interior housing ledge limits the angular position of the levers with respect to the housing. First and second permanent magnets are connected with the respective first and second levers. The magnets are provided for attracting a workpiece. A pneumatic piston actuator is also provided on the housing for pivoting the levers with respect to the housing. The piston has a rod pivotally contacting the levers.

An object of the present invention is to provide a magnetic carrier which is composed of a relatively few simple parts, is rugged and durable in use, and is capable of being inexpensively manufactured and assembled.

The above-noted objective and other advantages of the present invention will become more apparent to those skilled in the art as the invention is further explained in the accompanying drawings and detailed description.

DETAILED DESCRIPTION OF THE PREFERRED EMBODIMENTS

Figure 1:
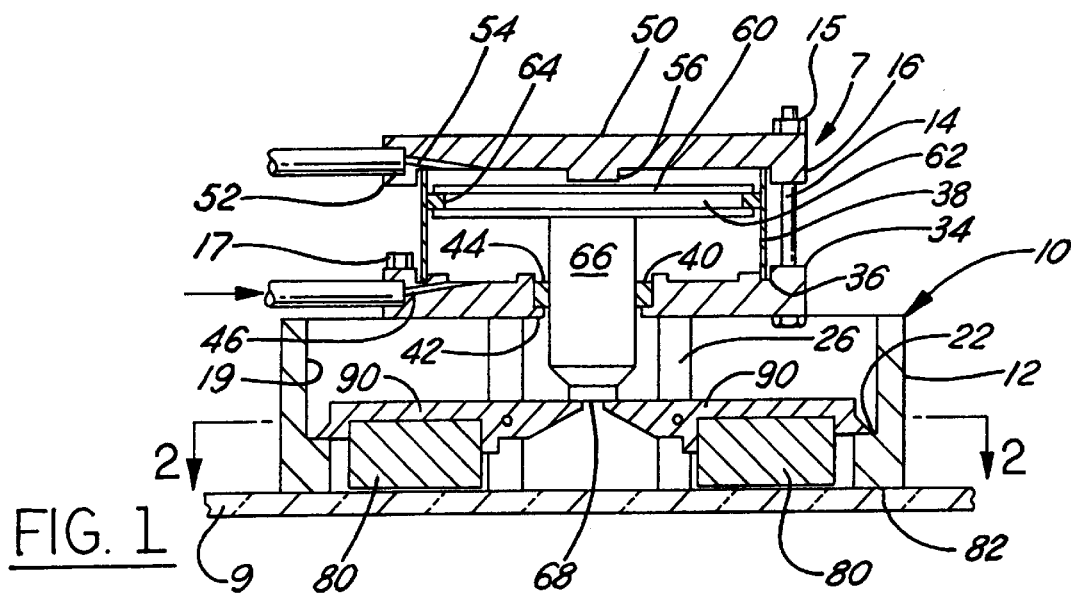
FIG. 1 is a front elevational sectional view of a preferred embodiment magnetic carrier according to the present invention.
Figure 2:
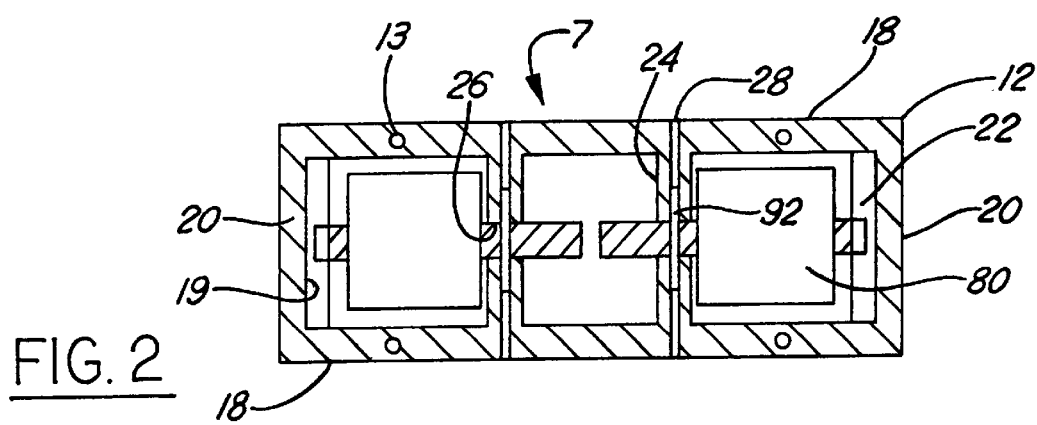
FIG. 2 is a sectional view taken along lines 2—2 of FIG. 1.
Figure 3:
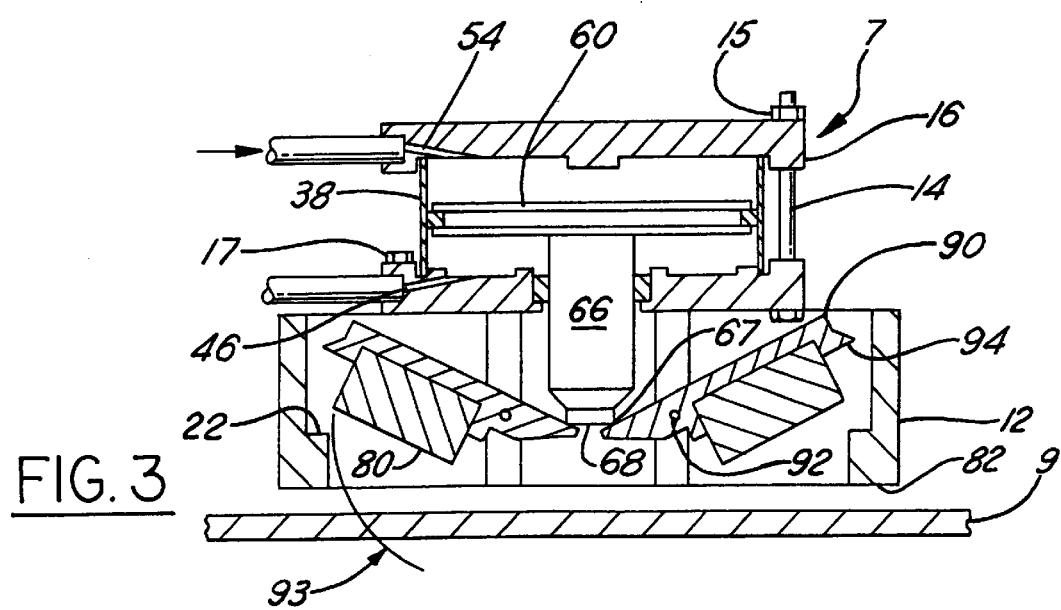
FIG. 3 is an operational view of the magnetic carrier shown in FIG. 1.

Referring to FIGS. 1 through 3, there is shown a magnetic carrier 7 having a two part housing 10. The housing 10 has a lower frame 12 which is typically fabricated from a nonmagnetic material such as molded urethane or aluminum.

The lower frame 12 has threaded vertical bores 13. Bolts 17 have lower ends threadably inserted within the vertical bores 13 to hold the upper frame 16 on the lower frame 12. Nuts 15 are threaded on the upper ends of tie rods 14 to removably connect and clamp top plate 50 and lower plate 34 to cylinder 38. In this embodiment, the upper frame 16 in the magnetic carrier 7 does not completely cover the lower frame 12 so as to leave a portion of the top of the lower frame open.

The lower frame 12 is generally rectangular in its perimeter shape, having two side walls 18 joined along their ends by cross walls 20. An interior surface 19 of each cross wall 20 has a shoulder ledge 22 (FIGS. 1, 3). Extending inwardly from the side walls 18 are two parallel inner ribs 24. The inner ribs 24 have a milled vertical window 26 (FIG. 2). Intersecting the milled vertical window 26 and the side walls 18 are horizontal cross bores 28.

As noted above, the upper frame 16 has a lower plate 34. The lower plate 34 is typically fabricated from aluminum to save weight. The sides of the lower plate 34 typically extend laterally beyond the side walls 18 of the lower frame. The lower plate 34 has a series of through bores allowing passage of the tie rods 14 therethrough.

The lower plate 34 has an annular groove 36 which receives and mounts a thin walled actuator cylinder 38. Thin wall cylinder 38 can be fabricated from a transversely cut portion of seamless aluminum tubing or machined from stock material. The lower plate 34 also has a multi-diametered inner bore 40 having a lower annular shoulder 42 which supports a sealing ring 44. Pressurized fluid may be directed to an interior portion of thin walled cylinder 38 through fluid passage 46 supplied through the lower plate 34. The passage 46 may be threaded to accept a standardized hydraulic or pneumatic fitting, as desired.

The top plate 50 on top frame 16 is also fabricated from aluminum. The top plate 50 is adapted to be flexibly, pivotally or rotatively mounted to a robot arm (not shown) or other material handling device. The top plate is bored to allow the tie rods 14 to pass through the top plate 50.

The top plate 50 has an annular rim 52 to retain the thin walled cylinder 38.

Top plate 50 also has a fluid passage 54 allowing for the addition or removal of pressurized fluid within the thin walled cylinder 38. The top plate 50 has a piston stop 56 to insure that the fluid passage 54 is always exposed to the interior of the thin wall cylinder 38. In a manner previously described for the bottom plate 36, the passage 54 can be threaded to accept standardized hose fittings for hydraulic or a preferred pneumatic fluid.

Slidably and sealably mounted within the thin walled cylinder 38 is a linear actuator in the form of piston 60. The piston 60 has an annular groove 62 which receives an annular sealing member 64. The piston 62 also has a piston rod 66 having a lower tip 68. The piston rod extends from piston 60 into housing 10 to define the movement axis for cylinder 38. As viewed in FIG. 1, cylinder 38 is centrally located relative to walls 20, 20 of housing 10, so that the axis of piston rod 66 is coincident with the central vertical axis of housing 10. In the embodiment shown in FIGS. 1–3, the magnetic carrier 7 has at least one and preferably two or more magnets 80. The magnets 80 are spaced apart permanent magnets and can be made from ferrite and alnico. However, if desired, a rare earth magnet can also be used.

First and second levers 90 pivotally mount (or hold) the magnets 80 along a first pivotal axis with respect to the housing 10. The levers 90 are typically made from a magnetic material such as steel to securely hold the magnets 80 with a press fit, adhesive bond, or pinned connection. Each lever 90 has a press fit pivot pin 92 which is installed into the lever 90 through the cross bore 28 (FIG. 2). The pin 92 is free to rotate within the cross bore 28, allowing the lever to pivot with respect to the housing 10. A projected pivotal radius of curvature 93 of the magnets 80 is shown in FIG. 3. An extreme end of each lever is provided with a stop 94. The stop 94 limits an extreme angular position of the lever 90 and magnet 80 with respect to the housing 10 by contacting the ledge 22. The stop 94 also spaces the magnets within the lower frame 12 slightly above the bottom edge 82 of the frame and thereby prevents contact between the magnets and a workpiece.

In operation, the magnetic carrier 7 is moved by a lifting device such as a robotic arm to a position adjacent to a workpiece 9 such as a stamping or sheet metal part located in a stamping die or the like. The magnetic carrier 7 has its fluid passages 46 and 54 appropriately connected to the plant air system. To achieve the FIG. 1 condition, the fluid passage 54 is connected to a local or plant air exhaust and the fluid passage 46 is connected with the plant air supply. The weight of the magnets 80 will cause the levers 90 to be positioned in a horizontal position (as shown in FIG. 1). Preferably, the plant air should supply 50 p.s.i.; however, the thin walled cylinder 38 can be sized to work with lower air supply pressures. In the example shown, the volume of the thin walled cylinder 38 is approximately one (1) cubic inch.

The magnets 80 attract the workpiece 9 to the magnetic carrier 7. The magnets 80 may, if desired, be designed to make direct contact with the workpiece 9 or a slight spacing (as shown in FIG. 1) may be desired to prevent contacting wear upon the magnets 80 and to facilitate release of the workpieces. The magnetic carrier 7 can then transport the workpiece 9 to its desired location. The magnetic carrier 7 is effective on thick pieces of metal as well as on sheet metal parts. Typically, the workpiece 9 will be a sheet metal stamping that is being transferred between stamping locations or metal processing locations. If a gap does not exist between the magnets 80 and the workpiece 9 as shown in FIG. 1, excessive contact of the magnets 80 with the workpiece 9 will be prevented by contact of the lever extreme ends 94 with the ledges 22.

Referring to FIG. 3, upon placement of the workpiece 9 in its new desired location, fluid passageway 46 is connected with the plant pneumatic exhaust and fluid passageway 54 is connected with the pressurized air supply. The entry of fluid within thin walled cylinder 38 above piston 60 will actuate piston rod 66 to move downwardly, approximately 0.25 in, causing its tip 68 to pivotally contact the levers 90 to actuate the magnets 80 upwards and away from the workpiece 9, so that the workpiece 9 may be released. The edge 67 of lower tip 68 is in sliding contact with the levers 90 during pivotal lifting movement of the magnets. To prevent any opportunity of the magnets 80 sticking with the workpiece 9, the magnets are fixably connected with the levers 90.

Figure 4:
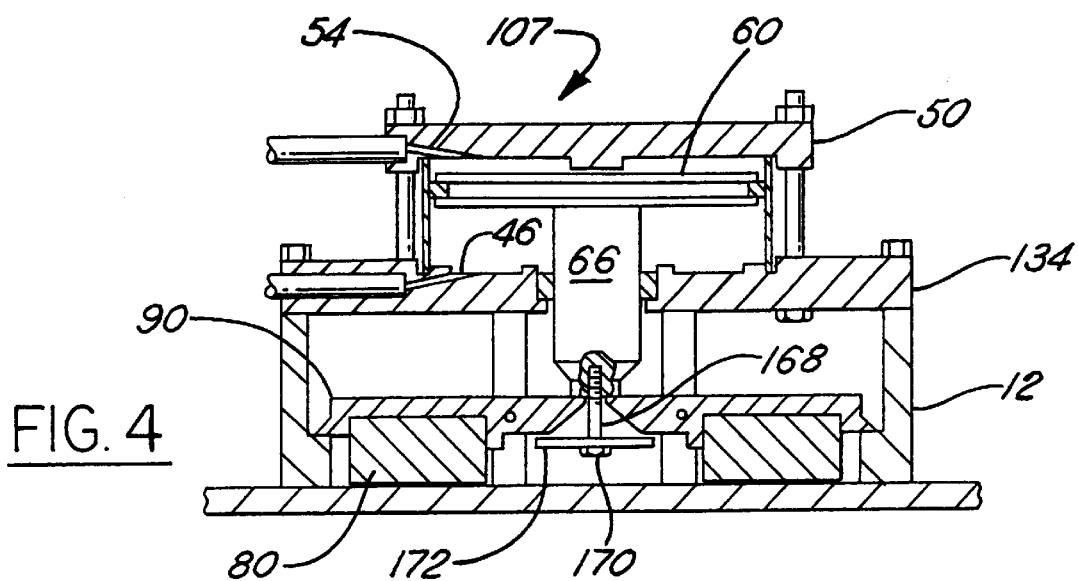
FIG. 4 is a view substantially similar to that of FIG. 1 illustrating an alternative preferred embodiment of the present invention having a positive pull back actuator.

Referring to FIG. 4, an alternative preferred embodiment magnetic carrier 107 according to the present invention is provided. In the magnetic carrier embodiment 107, like items are given common reference numerals. The lower plate 134 of the magnetic carrier 107 has been extended to cover the complete top of the lower frame member 12. The modification of the lower plate 134 keeps out dust and undesired foreign matter from the interior of the lower frame member 12 and the magnets 90. The magnetic carrier 107 has a modified piston rod tip 168. Piston rod tip 168 has threadably connected thereto a bolt 170. The bolt 170 has a head which retains an oversized washer 172.

The operation of magnetic carrier 107 is substantially similar to that of the operation described for magnetic carrier 7. However, referring to FIG. 3, magnetic carrier 7 relies upon gravitational forces acting upon the levers 90 to return the magnets 80 to their position as shown in FIG. 1 after the workpiece 9 has been released. In the embodiment of the magnetic carrier 107 shown in FIG. 4, there is a positive pullback of the levers 90 to their operational position. The positive pullback is achieved by the pressurization of the thin walled cylinder 38 underneath the piston 60 via application of pressurized air through passageway 46 thereby causing the washer 172 to contact and pivot the levers 90 back to the operational position. Positive pull back allows the magnetic carrier 107 to be used in all orientations. For instance, positive pull back is beneficial when it is desired to grip a workpiece by placing the magnetic carrier 107 underneath a workpiece 9.

It is generally preferable to drive the upper or "blind" side of the piston downwardly when disengaging the magnets from the workpiece, since a greater force can be achieved. That is, the blind side of the piston has a greater surface than the underside which loses surface area to the piston rod 66. The force required to release the magnets is generally greater than that needed to pull the magnets back to their rest position.

Figure 5:
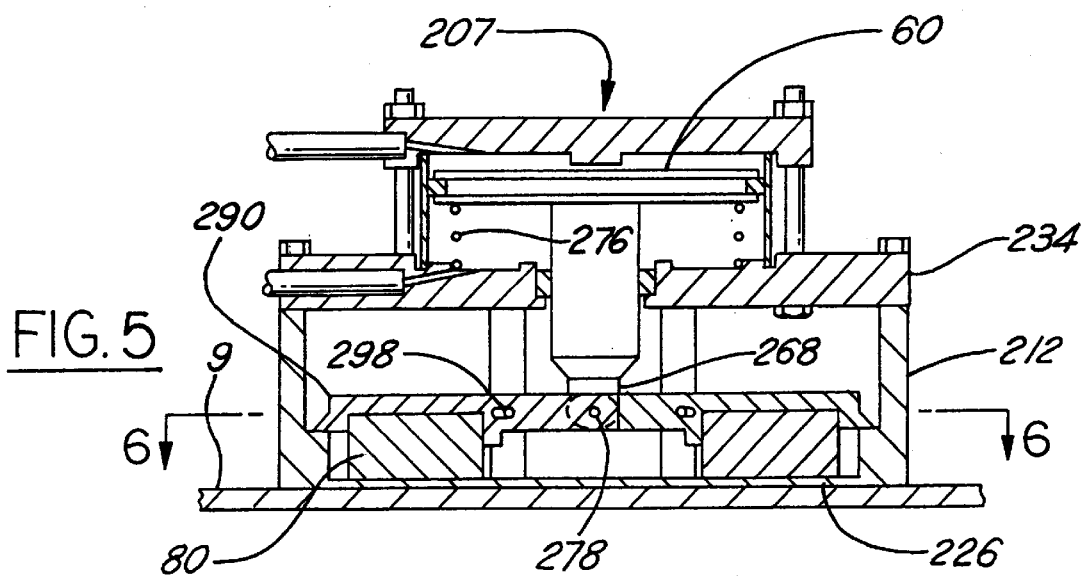
FIG. 5 is a view substantially similar to that of FIG. 1 illustrating still another preferred embodiment magnetic carrier according to the present invention having a lower frame with a bottom covered.
Figure 6:
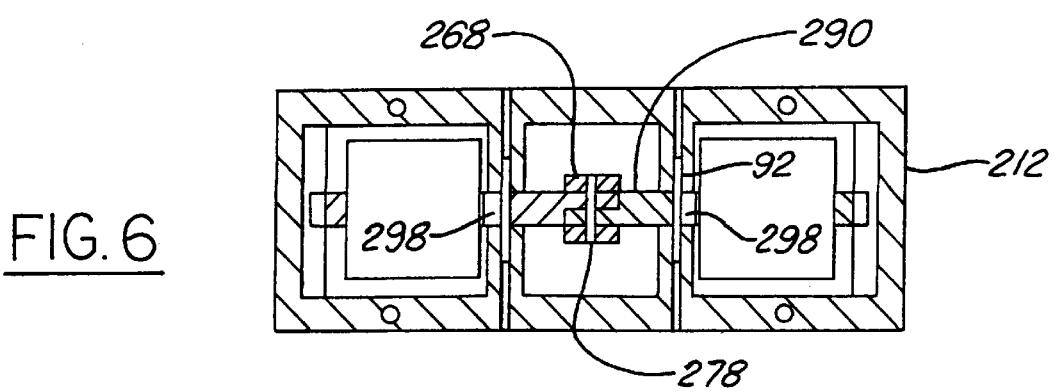
FIG. 6 is a sectional view taken along line 6—6 of FIG. 5.

FIGS. 5 and 6 illustrate still another preferred alternative embodiment of the present invention. In FIGS. 5 and 6, the magnetic carrier 207 has a lower plate 234 substantially similar to the above-described lower plate 134. Additionally, the lower frame 212 has an integral non-magnetic bottom cover 226 that can be about 0.040 inches in thickness that completely encloses the interior of the lower frame 212. The cover 226 keeps out dust and prevents the magnets 80 from damaging any surface finish on the workpiece 9.

The magnetic carrier 207 has a modified piston tip 268. Piston tip 268 is directly, pivotally contacting and connected to both of the levers 290 by a pin 278. The levers 290 have elongated lost motion slots 298 at their pivotal connections with the pins 92 to allow the unimpeded constant pivotal connection with the piston tip 268. As shown in FIG. 5, an optional light coil spring 276 biases the piston 60 and magnets 80 to the operational position.

The operation of magnetic carrier 207 is substantially the same as that previously described for magnetic carrier 107 in that it positively lifts and lowers the levers 290. A particular advantage of the invention is the ability to substitute the magnetic lifting carriers 7, 107, 207 for prior venturi automated suction cups while using the same shop air and air driving and release sequences used with venturi cups. The linear actuator, i.e. piston 60, converts linear motion to pivotal motion in such a manner as to effect positive magnetic release and engagement of workpieces.

While the present invention was illustrated and described with respect to various preferred embodiments, such descriptions are exemplary only and not limiting in nature. It is well understood by those skilled in the art that various changes and modifications can be made in the invention without departing from the spirit and scope thereof, which is limited only by the appended claims.

What is claimed is:

1. A magnetic pick-up device for extracting magnetically permeable work pieces from a stamping die, comprising:

an elongated housing having a central axis;

an air-operated cylinder means located on said housing, said cylinder means having a movement axis that is coincident with the housing central axis;

said air-operated cylinder means comprising a cylindrical chamber means, a piston slidably disposed within said chamber means for movement along said movement axis, and a piston rod located on said movement axis; said piston rod extending from said piston out of said cylindrical chamber means into said housing; said piston subdividing said cylindrical chamber means into a first air chamber proximate to said housing and a second air chamber remote from said housing; said cylindrical chamber means having a diameter that is appreciably greater than the axial dimension of said chamber means;

two magnet holders located within said housing in symmetrical relation to the housing central axis; a transverse pivot means pivotably supporting each said magnet holder for swinging motion around an axis that is transverse to the housing central axis; said magnet holders having adjacent ends thereof pivotably connected to said piston rod, whereby movement of the piston rod produces simultaneous swinging motions of the magnet holders;

a permanent magnet carried by each magnet holder; each said magnet having a flat pick-up surface adapted to exert a magnetic lifting force on a work piece, whereby the work piece can be removed from a stamping die;

said magnet holders being swingable between operating positions wherein the magnet pick-up surfaces are aligned in a plane transverse to the housing central axis, and retracted positions wherein the magnet pick-up surfaces are angled away from the housing central axis; each magnet pick-up surface being angled at a relatively small acute angle to said transverse plane during initial movement of the respective magnet from its operating position.

2. The magnetic pick-up device of claim 1, wherein each said pivot means is located relatively close to the piston rod movement axis.

3. The Magnetic pick-up device of claim 1, wherein each said pivot means is located relatively close to the piston rod movement axis, so each said pivot means is between the piston rod movement axis and the respective magnet.

4. The magnetic pick-up device of claim 1, wherein each said pivot means comprises a pin-slot connection that includes a pin mounted in the housing and a slot formed in the associated magnet holder.

5. The magnet pick-up device of claim 1, and further comprising ledge means located within said housing for limiting the movement of each magnet holder when the magnets reach the operating positions, whereby the magnet pick-up surfaces are precisely aligned in a common plane.

6. The magnetic pick-up device of claim 1, wherein said air-operated cylinder means comprises two end plates extending normal to the cylinder means movement axis; and an air hose connection passage formed in each said end plate for transferring pressurized air between the respective air chamber and an associated air hose; each said air passage extending essentially parallel to the plane of the respective end plate, whereby the associated air hose extends away from the air cylinder means in a plane normal to the air cylinder means movement axis.

* * * * *